(12) United States Patent
Trunick et al.

(10) Patent No.: US 11,316,853 B2
(45) Date of Patent: Apr. 26, 2022

(54) SYSTEMS AND METHODS FOR IMPROVING COMPUTER IDENTIFICATION

(71) Applicant: VISA INTERNATIONAL SERVICE ASSOCIATION, San Francisco, CA (US)

(72) Inventors: Joel Trunick, Austin, TX (US); Keeshini Manivannan, Austin, TX (US); Manan Lalaji, Austin, TX (US); Dipeshkumar Patel, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/297,374

(22) PCT Filed: Nov. 30, 2018

(86) PCT No.: PCT/US2018/063403
§ 371 (c)(1),
(2) Date: May 26, 2021

(87) PCT Pub. No.: WO2020/112142
PCT Pub. Date: Jun. 4, 2020

(65) Prior Publication Data
US 2021/0359993 A1    Nov. 18, 2021

(51) Int. Cl.
*H04L 9/08* (2006.01)
*H04L 29/06* (2006.01)
*H04L 9/32* (2006.01)

(52) U.S. Cl.
CPC ........ *H04L 63/0876* (2013.01); *H04L 9/0866* (2013.01); *H04L 9/3242* (2013.01)

(58) Field of Classification Search
CPC .. H04L 63/0876; H04L 9/0866; H04L 9/3242
See application file for complete search history.

(56) References Cited

U.S. PATENT DOCUMENTS

| 10,992,669 | B2 * | 4/2021 | Correa | H04L 9/3239 |
| 2012/0215896 | A1 * | 8/2012 | Johannsen | H04L 41/0853 709/223 |
| 2015/0067472 | A1 * | 3/2015 | Chen | G06F 16/9577 715/234 |

(Continued)

OTHER PUBLICATIONS

Preuveneers et al., "SmartAuth: dynamic context fingerprinting for continuous user authentication." In: Proceedings of the 30th Annual ACM Symposium on Applied Computing. Apr. 17, 2015. Retrieved from <https://core.ac.uk/download/pdf/34638110.pdf>.

(Continued)

*Primary Examiner* — Khoi V Le
(74) *Attorney, Agent, or Firm* — Loeb & Loeb LLP (57) ABSTRACT

A processor-implemented method for improving computer identification comprising transmitting a browser fingerprinting test to one or more computing devices and receiving test data from the one more computing devices that includes at least an elapsed processing time and a hash code. The method includes determining an average elapsed processing time and determining a uniqueness level for the browser fingerprinting test by comparing the hash codes for each computing device with one another.

20 Claims, 5 Drawing Sheets

(56) References Cited

U.S. PATENT DOCUMENTS

| | | | |
|---|---|---|---|
| 2015/0365827 A1 | 12/2015 | Badenhorst | |
| 2016/0155128 A1* | 6/2016 | Desai | G06Q 20/3227 705/44 |
| 2017/0308741 A1* | 10/2017 | Gleim | G06K 9/00899 |
| 2019/0007412 A1* | 1/2019 | Ram | H04W 12/06 |

OTHER PUBLICATIONS

International Search Report and Written Opinion of corresponding International Application No. PCT/US2018/063403, dated Feb. 12, 2019, 11 pages.

\* cited by examiner

FIG. 6 ly during the compute the compute the compute the computer

SYSTEMS AND METHODS FOR IMPROVING COMPUTER IDENTIFICATION

CROSS-REFERENCE TO RELATED APPLICATIONS

This application is a national stage entry under 35 U.S.C. 371 of International Patent Application No. PCT/US2018/063403, filed on Nov. 30, 2018, the disclosure of which is incorporated by reference herein in its entirety.

FIELD OF THE INVENTION

The invention relates to systems and methods for improving trustworthiness of computer communications.

BACKGROUND

When conducting communications between computers, such as posting messages on message boards, leaving reviews on review sites or with a particular service provider or product merchant, conducting online purchases, etc., it is common for the parties involved on either end of the communication to be strangers. As a result, it may be difficult for a party to such communications to know whether the opposite part is trustworthy. Various methods have been developed to help identify the computers communicating to ensure the trustworthiness of the communications between computers. For example, entities operating Internet websites may upload "cookies" onto computers that visit the website may be later identified. However, users of the visiting computers may simply delete those cookies, defeating the identification method. Other methods of increasing trustworthiness have their own advantages and disadvantages.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, the disclosure describes a system and methods for identifying improved browser fingerprinting techniques that may be implemented to more effectively and efficiently identify computing devices with which a server or other entity may be communicating. The system may include transmitting a fingerprinting test method to one or more computing devices and retrieving test results after the fingerprinting tests have been run. The system also includes analyzing the aggregated test results to determine improved uniqueness and time performance for the fingerprinting tests.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The improved computer identification system and methods described herein may provide an improved method of determining the risk of participating in a particular computer communication. For example, the system may help a credit card company processing purchases or other transactions determine the best or a better way to determine whether that credit card company has participated in successful transactions with that computing device in the past. If the credit card company or other transaction or communication processor has confidence that it has conducted successful, non-fraudulent transactions with a computing device associated with a particular use, then the credit card company may move forward with additional transactions confident that the risk of fraud may be lower than with an unknown computing device.

In some embodiments, it may also be useful to identify a particular computing device that has been used for fraudulent activity in the past. For example, if a user's smart phone or other computing device has been stolen, it may be used to make a fraudulent or otherwise problematic transaction. Once that activity is identified as fraudulent, a transaction processor may identify that particular computing device as carrying an increased likelihood of fraud and, for example, refuse approval of activity from that device. For entities such as credit card issuers or other bank or financial entities, being able to associate whether a computing device has been used for previous transactions may be useful for determining risk, for example, the risk of a particular transaction. In some embodiments, a computing device may have previously been used for an attack or hacking attempt, or that device may be reported as stolen.

Traditionally, issuers or any other transaction processors may have used cookies to identify a particular computing device with a particular web browser used for a given activity. Because users may block cookies or erase them after their installation, other techniques have also been developed. For example, some entities may use browser fingerprinting to help identify a computing device and browser combination. Browser fingerprinting may be made up of information collected about a remote computing device that may help identify user or computing devices even if cookies are blocked or erased. In some browser fingerprinting systems, a website operator, a transaction processor, credit card issuer, or other entity may store the browser fingerprints of the computing devices that visit a website or otherwise communicate online. By referring to these databases, companies or other online entities may determine information about the computing devices that match previously used browser fingerprints, such as the relative risk levels of further interactions with that computing device.

Browser fingerprinting may be accomplished in various ways, each of which include advantages and disadvantages. For example, some types of browser fingerprinting may include collecting a browser type and version (e.g., Google Chrome, Microsoft Internet Explorer, Apple Safari, Mozilla Firefox, etc.), the operating system on which the browser may be running (e.g., Windows, Apple OS, Linux, etc.), active plugins on the browser, the time zone, the language, the screen resolution, the font, and various other active browser or device settings. Although any given setting may be used by many users on many devices, it may become possible to narrow down particular users and devices based on specific combinations of all the data points described above. In some systems, this type of browser fingerprinting may be completed relatively quickly (e.g., in about 5-10 seconds), but may have a limited capability to narrow down the number of computing devices and browser combinations with matching fingerprints. In other words, some browser fingerprinting systems may work quickly but may be limited in the level of uniqueness attainable.

Some systems may use another type of browser fingerprinting that may be referred to as canvas fingerprinting. In canvas fingerprinting, the programing code (e.g., Java, HTML5, etc.) that is used to program a website or other online software may include code to determine the browser fingerprint for a particular computing device. For example, in HTML5 coding language, the code may include an element called a "canvas." In one embodiment, when a computing device visits a webpage or uses a web-based software application, fingerprinting script may draw text or other images in a given font or size using the computing device's hardware and software, such as the graphical processing unit (GPU) or other processors. In some embodiments, the drawn text or image is created on a hidden canvas so that it is not actually visible to the user of the computing device, but exists on the computing device itself. In some embodiments, the fingerprinting script may also add background colors to the text or image drawing as well.

The programing script may then initiate an application program interface (API), such as Canvas API's ToDataURL method, to which may return canvas pixel data in dataURL format. Variations in the GPU or other processor installed in the computing device may cause variations in the way the image data is represented, resulting in unique fingerprints. The data URL may contain a representation of the drawn image in a particular format, such as portable graphics format (PNG), JPEG, or other suitable format. In some embodiments, the data URL may essentially be an encoded representation of the binary pixel data represented on the canvas. The programing script may then use a hash function (i.e., take the "hash") of the text-encoded pixel data from the data URL to produce a hash value representing the drawn image. A hash function may be any function that maps data of arbitrary size to a fixed size that may be compared to other hashes. The hash value is the fingerprint that may then be stored or compared to previously generated hashes. If the browser fingerprinting has been successful, the hash value may be relatively unique in that it matches only the same computing device and browser combination used before, or at least very few other computing devices. In other words, in some embodiments, if the hash value for a current computing device matches the hash value of a prior communication or transaction, the chances are improved that prior-used computing device is the same as the computing device being used for the current activity.

Methods of browser fingerprinting may be measured by their "uniqueness." For example, 100% uniqueness would mean that the browser fingerprinting method may produce a hash value or other identifying data that is absolutely unique to a given computing device. In other words, 100% uniqueness in a browser fingerprinting method may mean that no other computing devices would have a matching fingerprint. 0% uniqueness may mean that all other computing devices would have a matching fingerprint. Most browser fingerprinting methods have uniqueness somewhere between 0% and 100%. In some embodiments, canvas fingerprinting may be combined with other browser fingerprinting methods to increase the uniqueness of the results.

Time may be another factor in browser fingerprinting. Generally, fingerprinting methods that result in greater uniqueness tend to take more time than fingerprinting methods resulting in less uniqueness. For example, retrieving a fingerprint based on browser type, operating system, font type, and other browser settings may be completed relatively quickly at least partially because the method involves merely retrieving data that is already stored. Because there may be fewer variable data points in such methods, however, the uniqueness may be relatively low. On the other hand, canvas fingerprinting may take more time due to the computational steps involved, but may result in more unique fingerprinting. In some embodiments, the time (and, therefore, uniqueness value) may vary even within different types of canvas fingerprinting. For example, a first type of canvas fingerprinting may draw a very simple image or text taking a relatively short amount of time, while a second type of canvas fingerprinting may draw a more complex image with more colors, etc., taking a relatively long amount of time.

Users of a website or other online software, however, may not have the patience to wait for communications or other transactions to be approved based on a browser fingerprinting method that takes a relatively long period of time to process. Accordingly, an ideal browser fingerprinting technique may strike a balance between the time taken to determine a fingerprint for a computer device and the level of uniqueness achieved. For example, achieving a uniqueness level of 50% may take less than one second in some fingerprinting methods, but 50% uniqueness may be too risky for certain websites or software operations. On the other hand, achieving 99% uniqueness may take more than more than one minute in some fingerprinting methods, which may be acceptable for certain applications but too long of a wait for others.

Thus, different entities operating different types of websites or browser-based software may have differing acceptable thresholds for variables like average time to determine a fingerprint, maximum time, and uniqueness level. For example, a credit card processor or another entity where fraud carries relatively high financial risks may determine that relatively long wait times are worthwhile before approving a transaction, and therefore may opt for a fingerprinting method with a high level of uniqueness but relatively long processing times. Other lower-stakes website operators, such as message boards or review sites, may accept lower uniqueness levels in exchange for fast fingerprint processing times.

The improved computer identification system provided herein may, in some embodiments, provide a method and systems for identifying browser fingerprinting techniques that offer an ideal balance between uniqueness and processing time. The ideal balance between these two factors may differ depending on the user or application, as described above. Determining this ideal balance has traditionally provided technical challenges because the time to execute a particular fingerprinting method may vary depending on the particular computing device and browser. Thus, in order to take processing time into consideration in determining the ideal fingerprinting method, it may be advantageous to test any fingerprinting method on a non-trivial number of computing devices of varying types to determine the average processing time across a representative set of varying devices. In some embodiments, the disclosure describes achieving this result by creating one or more tests for uniqueness (i.e., fingerprinting methods), that return a hash code based on the test and measure an elapsed time to execute. The uniqueness test may be run on a set of distinct devices and browsers to determine, and the data from each test may be returned to a central server that may record the hash code and elapsed execution time for each test run on each device browser. In some embodiments, the system may create a report using the server data that describes the uniqueness achieved by the particular test, the average time elapsed, the time per type of device, or any other data relevant to determining whether a particular fingerprinting test may be useful.

Figure 1:
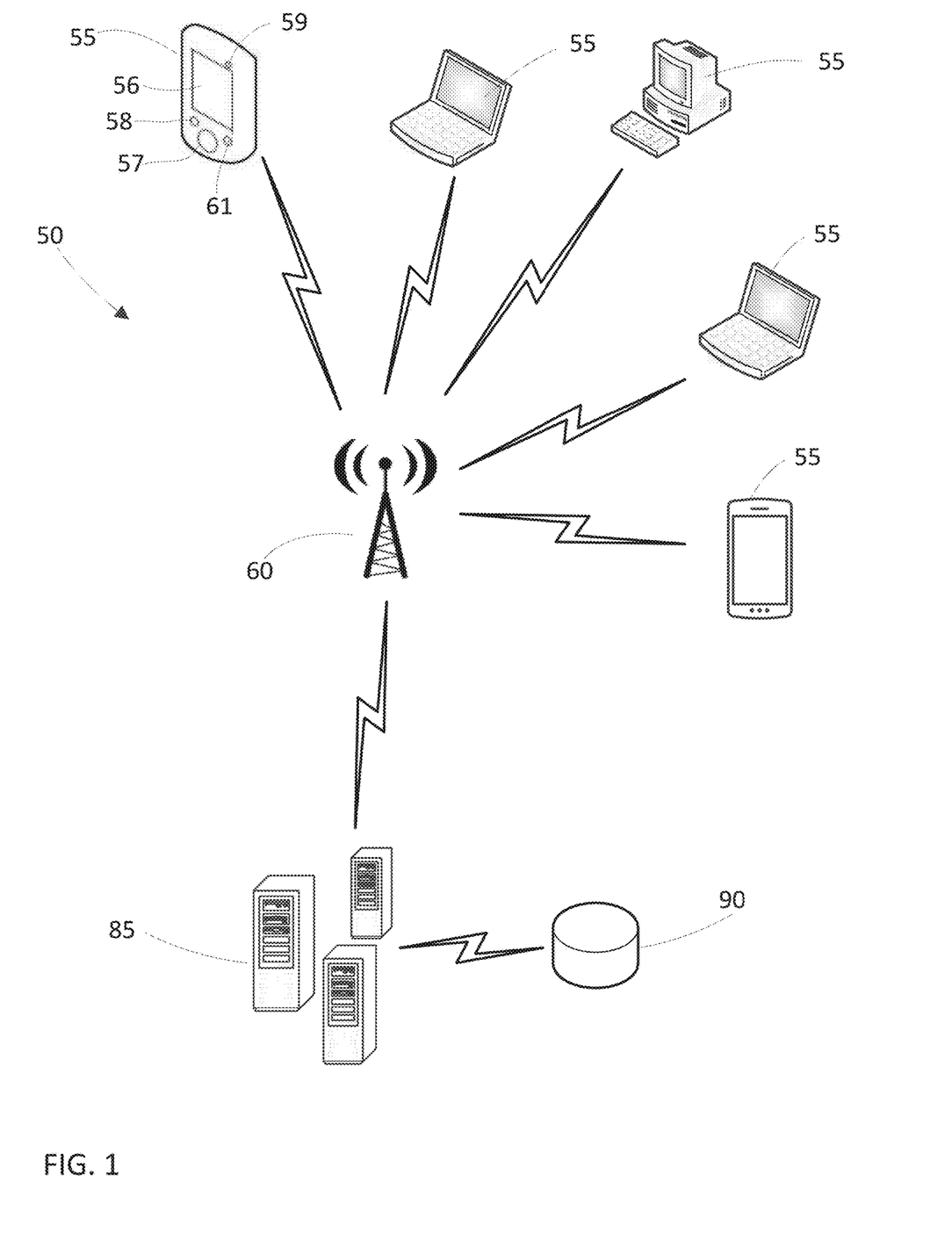
FIG. 1 is an illustration of the elements of an embodiment of a system that includes a system for improved computer identification as disclosed herein.

A high level illustration of some of the elements in a sample computing system 50 that may be physically configured to implement the improved computer identification system and methods is illustrated in FIG. 1. The system 50 may include any number of computing devices 55, such as smart phones or tablet computers, mobile computing devices, wearable mobile devices, desktop computers, laptop computers, or any other computing devices that allow users to interface with a digital communications network, such as digital communication network 60. Connection to the digital communication network 60 may be wired or wireless, and may be via the internet or via a cellular network or any other suitable connection service. At least one testing server 85 may be connected to the digital communication network 60. The testing server 85 may be operated by one of various types of parties, such as credit card issuers, merchants, website operators, financial services entities, banks, etc. Although not shown here, various other computer servers may also be connected to via the digital communication network 60, such as a merchant servers, payment servers, one or more issuer servers, token servers, etc. The testing server 85 may also be connected, either directly or over the digital communication network 60 to at least one fingerprint database 90. The database 90 may, in some embodiments be contained on the testing server 85, as described in greater detail below with respect to FIG. 3.

In one embodiment, the computing device 55 may be a device that operates using a portable power source, such as a battery. The computing device 55 may also have a display 56 which may or may not be a touch sensitive display. More specifically, the display 56 may have a capacitance sensor, for example, that may be used to provide input data to the computing device 55. In other embodiments, an input pad 57 such as arrows, scroll wheels, keyboards, etc., may be used to provide inputs to the computing device 55. In addition, the computing device 55 may have a microphone 58 which may accept and store verbal data, a camera 59 to accept images and a speaker 61 to communicate sounds.

Figure 2:
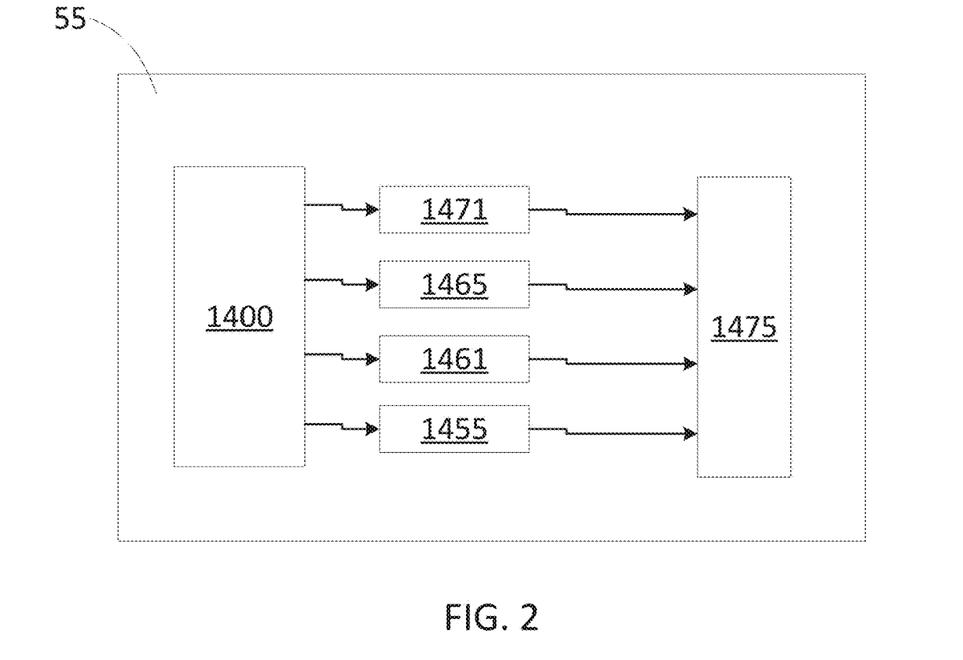
FIG. 2 is a schematic illustration of elements of an embodiment of an example computing device.
Figure 3:
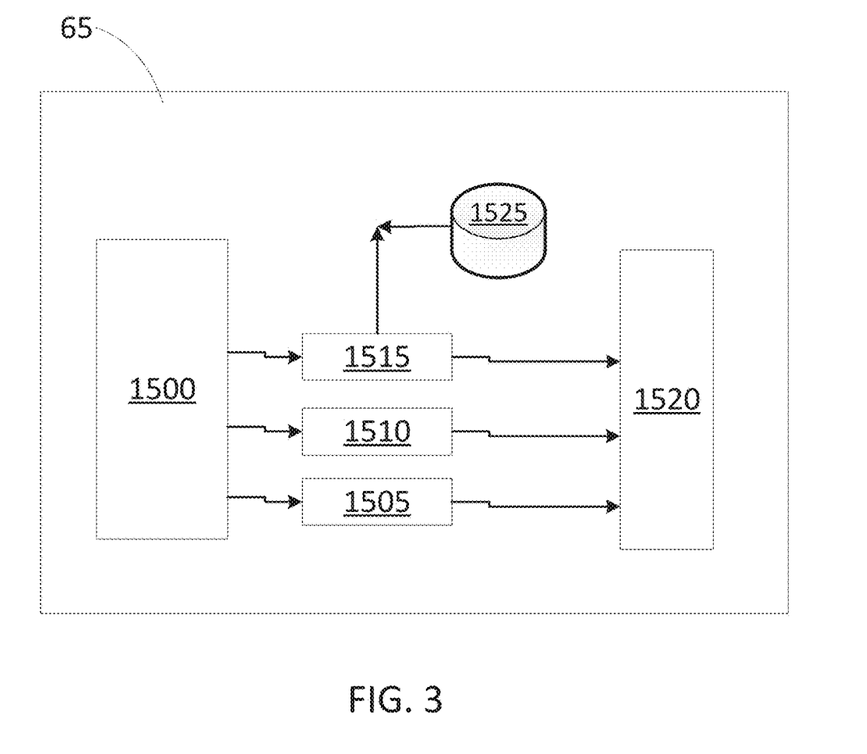
FIG. 3 is a schematic illustration of elements of an embodiment of a server type computing device.

FIG. 2 is a simplified illustration of the physical elements that make up an embodiment of a computing device 55 and FIG. 3 is a simplified illustration of the physical elements that make up an embodiment of a server type computing device, such as the testing server 85. Referring to FIG. 2, a sample computing device 55 is illustrated that is physically configured according to be part of the computing system 50 shown in FIG. 1. The computing device 55 may have a processor 1451 that is physically configured according to computer executable instructions. In some embodiments, the processor can be specially designed or configured to optimize communication between the server 85 and the computing device 55 relating to the payment selection service described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1451. There also may be an input/output bus 1475 that shuttles data to and from the various user input/output devices such as a microphone, a camera 59, a display 56, or other input/output devices. The computing device 55 also may control communicating with the networks, such as communication network 60 in FIG. 1, either through wireless or wired devices. Of course, this is just one embodiment of the computing device 55 and the number and types of computing devices 55 is limited only by the imagination.

The physical elements that make up an embodiment of a server, such as the testing server 85, are further illustrated in FIG. 3. In some embodiments, the payment server is specially configured to run the payment selection service as described herein. At a high level, the testing server 85 may include a digital storage such as a magnetic disk, an optical disk, flash storage, non-volatile storage, etc. Structured data may be stored in the digital storage such as in a database. More specifically, the server 85 may have a processor 1500 that is physically configured according to computer executable instructions. In some embodiments, the processor 1500 can be specially designed or configured to optimize communication between a portable computing device, such as computing device 55, and the server 85 relating to the payment selection service as described herein. The server 85 may also have a sound and video module 1505 which assists in displaying video and sound and may turn off when not in use to conserve power and battery life. The server 85 may also have volatile memory 1510 and non-volatile memory 1515.

A database 1525 for digitally storing structured data may be stored in the memory 1510 or 1515 or may be separate. The database 1525 may be database as fingerprint database 90 shown in FIG. 1, or may be a different database in some embodiments. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as communication network 60, either through wireless or wired devices. In some embodiments, a computer identification controller for running the improved computer identification system may be located on the computing device 55. However, in other embodiments, the computer identification controller may be located on testing server 85, or both the computing device 55 and the server 85. Of course, this is just one embodiment of the testing server 85 and additional types of servers are contemplated herein.

The computing device 55 may be able to communicate with a computer server or a plurality servers, such as the testing server 85. The computing device 55 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the server or may be through a digital communication network 60 such as cellular service, through the Internet, through a private network, through Bluetooth, etc.

In some embodiments, the testing server 85 may be associated with the improved computer identification system, and may send and receive information to and from a computing device 55 associated with performing browser fingerprinting operations as described herein. Specifically, software, such as one or more web browsers or other web based applications, may be included on the computing device 55 allowing communication with the testing server via the digital communications network 60. In some embodiments, the software may be an application through which a user may complete transactions, such as banking, money transfer, merchant purchases, etc., or to perform other types of online communications activity. In some embodiments, the software may be an add-on to a web browser included on the computing device 55. In some embodiments, software may be an application installed on the computing device 55 that allows for the use of other applications on the user computing device, such as applications provided by a bank, online merchant, email service, payment provider, website, etc.

Figure 4:
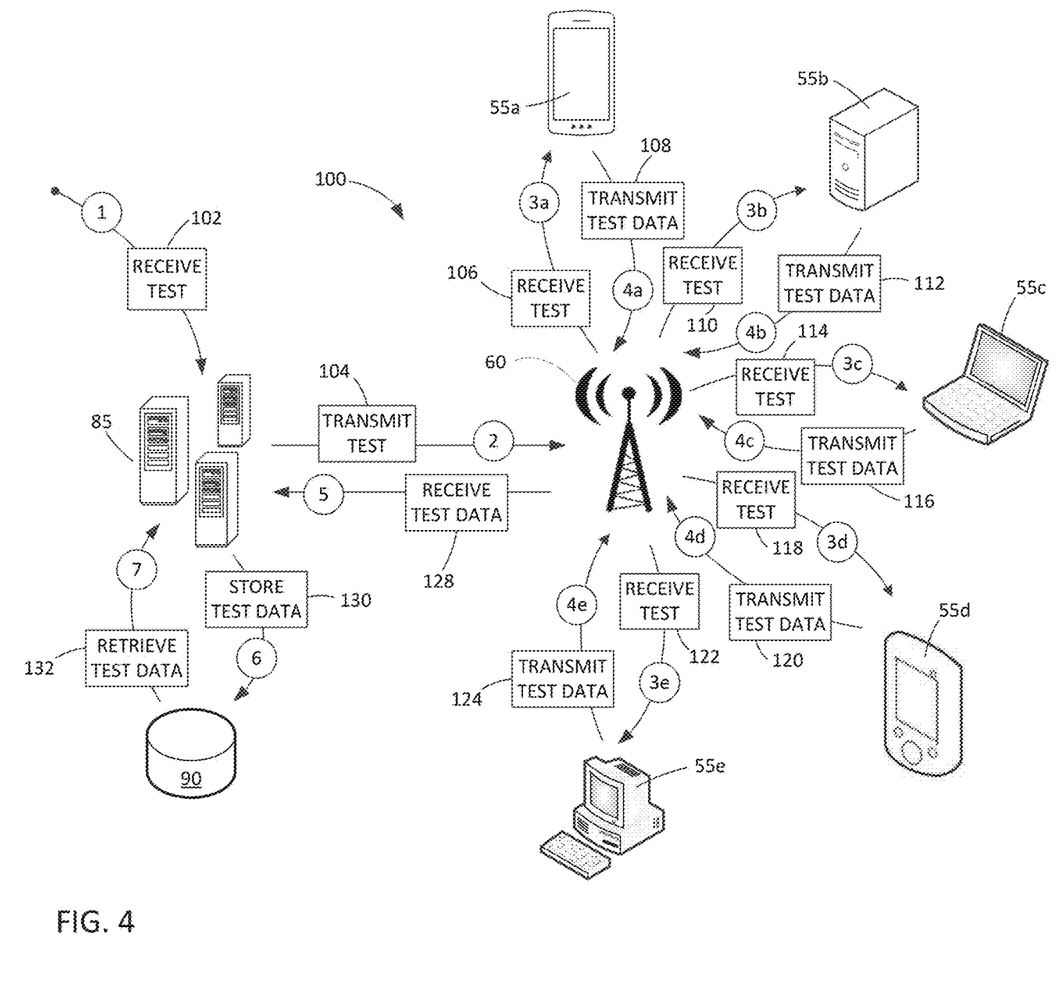
FIG. 4 is a block diagram illustrating system elements for an embodiment of an improved computer identification system in accordance with the current disclosure.

FIG. 4 is a data flow diagram generally illustrating an embodiment 100 of an improved computer identification system 100 that may determine the effectiveness browser fingerprinting methods or techniques in accordance with the disclosure. At 102, a fingerprinting test may be uploaded to the testing server 85. The fingerprinting test may be programing script designed to execute any of a variety of browser fingerprinting methods such as those described above. For example, the fingerprinting test may include canvas fingerprinting, gathering browser settings and operating system information, etc. In some embodiments, the fingerprinting test may include canvas fingerprinting methods that follow script similar to the following pseudocode:

create test image, draw:
Sphere & Cube
add lighting
create baseline image, draw:
Pyramid & Cube
add lighting
timeDeltaTest=test image elapsed time
timeDeltaBaseline=baseline image elapsed time
testImageHash=hash(test image)
hashBaslineImage=hash(baseline image)
Server.send(testData, testName, deviceIdentifer)

In this exemplary embodiment, the fingerprinting test may include programing script instructing a web browser or the GPU to draw an image named "test image" of a sphere and a cube, and add lighting to the image. Similarly, the script may include instruction to create an image named "baseline image" by drawing a pyramid and a cube, and adding lighting. One of ordinary skill in the art would recognize that other shapes may be used in other embodiments or across different tests, so long as the same instructions are used in subsequent tests and across devices.

A normalized hash code or hash value may then be created representing the image drawn. In some embodiments, adding lighting may result in one of the shapes (e.g., sphere, pyramid) shadowing the other image (e.g., cube). In some embodiments, instructing the browser to add lighting may create a discrepancy across hardware and/or software combinations as to how the image is computed. For example, an Apple® iPhone® device running the Safari® web browser may compute the instructed image differently than a Samsung® Galaxy® device running a Google® Chrome® web browser. Such differentiation in computation between devices and software combinations may result in the a normalized hash code or hash value that differs between devices, resulting in uniqueness.

As shown in the exemplary pseudocode above, the programing script for executing the fingerprinting test may include collecting timing and hash data. For example, "timeDeltaTest" may include storing the elapsed time for a test computing device to complete the image drawing process of the "test image," and the "timeDeltaBaseline" may include storing the elapsed time for the test computing device to perform the image drawing process of the "baseline image." Further, the "testImageHash" may include storing the compressed hash code or value representing the test image, and "hashBaslineImage" may include storing the compressed hash code representing the baseline image.

At 104, the programing script or other information used to run the fingerprinting test may be transmitted to a variety of computing devices 55*a-e* via a digital communication network 60, such as the Internet or any local area network (LAN) set up for the purposes of fingerprint testing or otherwise. In some embodiments, the group of computing devices 55*a-d* may be any number of devices running any combination of operating systems, web browsers, etc. In some embodiments, the devices 55*a-e* may be set up in a closed LAN for the specific purpose of conducting fingerprinting tests on a discrete combination of computing devices and software. In such embodiments, transmission of the fingerprinting test may be initiated by the device browsers pulling the fingerprinting test from the testing server 85. In some embodiments, transmission of the fingerprinting test may occur as a result of triggering the web browsers or other web based software to retrieve the test or by pushing the test from the testing server 85. At 106, 110, 114, 118, and 122, various distinct computing devices 55*a,* 55*b,* 55*c,* 55*d,* and 55*e* may receive the fingerprinting test and run it on the particular computing device's web browser or other application. The computing devices 55*a-e* may generate data from the test, such as a device identifier, test ID, hash code, elapsed test time, browser settings, operating system, etc. At 108, 112, 116, 120, and 124, the computing devices 55*a-e* may transmit the test data to the testing server 85, which may receive the test data at 128.

The testing server 85 may, at 130, store the received test data in the fingerprint database 90. In some embodiments, the test data in the fingerprint database 90 may be organized such that the particular types of test data received is categorized based on a variety of variables. For example, for each device upon which the fingerprint test is run, the fingerprint database 90 may store data including test run time, browser type, device type, browser settings, hash code for the images drawn, etc. Further, in some embodiments where multiple types of fingerprint tests may be run, the database 90 may further store the test results categorized under which test they resulted from, such as a first test, a second test, etc. At 132, the testing server 85 may retrieve the test data from the fingerprint database 90 for aggregation. The aggregated fingerprint test results may be analyzed to determine broad or specific trends in the data that may be used to determine the viability and usefulness of any given fingerprinting test. For example, the aggregated test data retrieved by the testing server 85 may include data for maximum and minimum run time for a particular fingerprinting test on a particular type of device or device/browser combination, or across all devices and device/browser combinations. The aggregated test data may also include average test run times across any combination of devices, browsers, etc.

In some embodiments, analyzing the aggregated test data by the testing server 85 for a particular fingerprinting test may include determining a uniqueness level for the fingerprinting test based on the number or percentage of unique hash codes retrieved. For example, a particular fingerprinting test may be run on 100 distinct computing devices, each resulting in a hash code received by the server 85 and stored in the fingerprint database 90. In some embodiments, the testing server 85 may analyze the 100 hash codes and determine that 97 of the 100 hash codes are unique. In some embodiments, a particular hash code may be considered "unique" of none of the other 99 hash codes match the particular hash code. In embodiments where 97 of the 100 hash codes are unique, the particular fingerprinting test may be considered to have a uniqueness level of 97%. Similarly, another fingerprinting test may result in a uniqueness level of 95%, or 90%, or 85%, or 80%, or 99%, or any other uniqueness level between 0% and 100%. One of skill in the art will appreciate that any number of computing devices may be used to test any particular fingerprinting method or test, and may therefore return more or less fine-grained uniqueness levels. For example, if a particular fingerprinting method is tested on 1,000 computing devices and the aggregated test data indicates that 925 of the 1,000 devices return unique hash codes, the particular test may be determined to have a uniqueness level of 92.5%.

The pseudocode below may represents an exemplary embodiment of programing script to aggregate the test data retrieved by the testing server 85:

```
testData(testName):
    total = count of devices test ran
    unique = count of unique hash codes
    percentUniq = unique / total * 100
    avgTime = sum(elapsed) / total
    maxTime = max(testName)
    minTime = min(testName)
improvedTestUniqueness
    testData(percentUnique(test)) >testData(percentUnique(baseline))?
improvedTestTime
    testData(avgTime(test)) < testData(avgTime(baseline))?
```

In such an embodiment, the testing server 85 may aggregate data from a fingerprint testing method, such as "total" representing the total count of computing devices upon which the particular fingerprinting test (e.g., "testName") has been run. The data may also include the number of unique hash codes retrieved from the tests, and "percentUniq" may be a uniqueness level defined as the number of unique hash codes divided by the total number of hash codes (i.e., computing devices tested), time one hundred. The data may include an "avgTime" representing the average elapsed time for the fingerprinting test to run across all tested devices, defined as the sum of the individual elapsed processing times divided by the total number of devices tested. Further, "maxTime" may but the maximum elapsed time among the tested computing devices, and "minTime" may be the minimum elapsed time among tested computing devices. In some embodiments, the testing server 85 may also include script to determine whether the uniqueness level of a particular fingerprinting test method is improved as compared to a threshold uniqueness level or "baseline" uniqueness percentage. The uniqueness of a particular fingerprinting test may qualify as "improvedTestUniqueness" if the uniqueness of the particular test is greater than the baseline level of uniqueness. Similarly, the average elapsed time to run a particular fingerprint test may be considered "improvedTestTime" if the average elapsed time is less than a baseline average time, or time threshold.

A user may design multiple different types of fingerprinting tests that determine browser fingerprints in varying ways and then use the aggregated test data to determine which fingerprint test or tests are preferable overall or for a particular application. In some embodiments, testing of multiple types of fingerprinting tests may be run to determine a uniqueness level reaches a satisfactory threshold without the average elapsed processing time being unreasonably high. For example, in some embodiments, a uniqueness threshold may be set at 93% and an average processing time threshold at 10 seconds. In some embodiments, a uniqueness threshold may be set at 95% and an average time threshold may be set at 15 seconds. In some embodiments, the uniqueness threshold may be set at 85% and the time threshold at 2 seconds. Generally, it may be considered ideal to maximize uniqueness levels and minimize elapsed processing time. Of course, one skilled in the art will recognize that any combination of uniqueness levels and elapsed processing time may be considered "ideal" depending on the application.

In some embodiments, a user or an operator of a website or other software application may establish a uniqueness-time ratio (UTR) to determine the type of fingerprinting test that would be most useful and effective. For example, in some embodiments, a uniqueness-time ratio may be defined as the percentage of the uniqueness level divided by the average elapsed processing time to run a particular fingerprint test:

$$UTR = \frac{\text{Uniqueness \%}}{\text{time}}$$

Those skilled in the art would recognize that, if "time" is calculate in seconds, the UTR may have a lower limit of zero seconds, but an unbounded upper limit. It should be understood, however, that it may be appropriate to utilize different units for time (e.g., microseconds) in certain applications.

In some embodiments, user may set a threshold level for an acceptable UTR, particularly where a specific uniqueness or elapsed processing time may not be important. For example, a user may determine that a UTR of 50 represents an ideal balance between uniqueness and elapsed processing time. A UTR of 75, however, may be achieved with a substantially limitless combination of uniqueness and elapsed time, such as 100% uniqueness and 1.33 seconds, 50% uniqueness and 0.67 seconds, etc. In some embodiments, a user may prefer to set a lower bound, or minimum uniqueness threshold, on the uniqueness level for what may be considered an acceptable UTR, such as 90%, or an upper bound on the elapsed time, or maximum time threshold.

Figure 5:
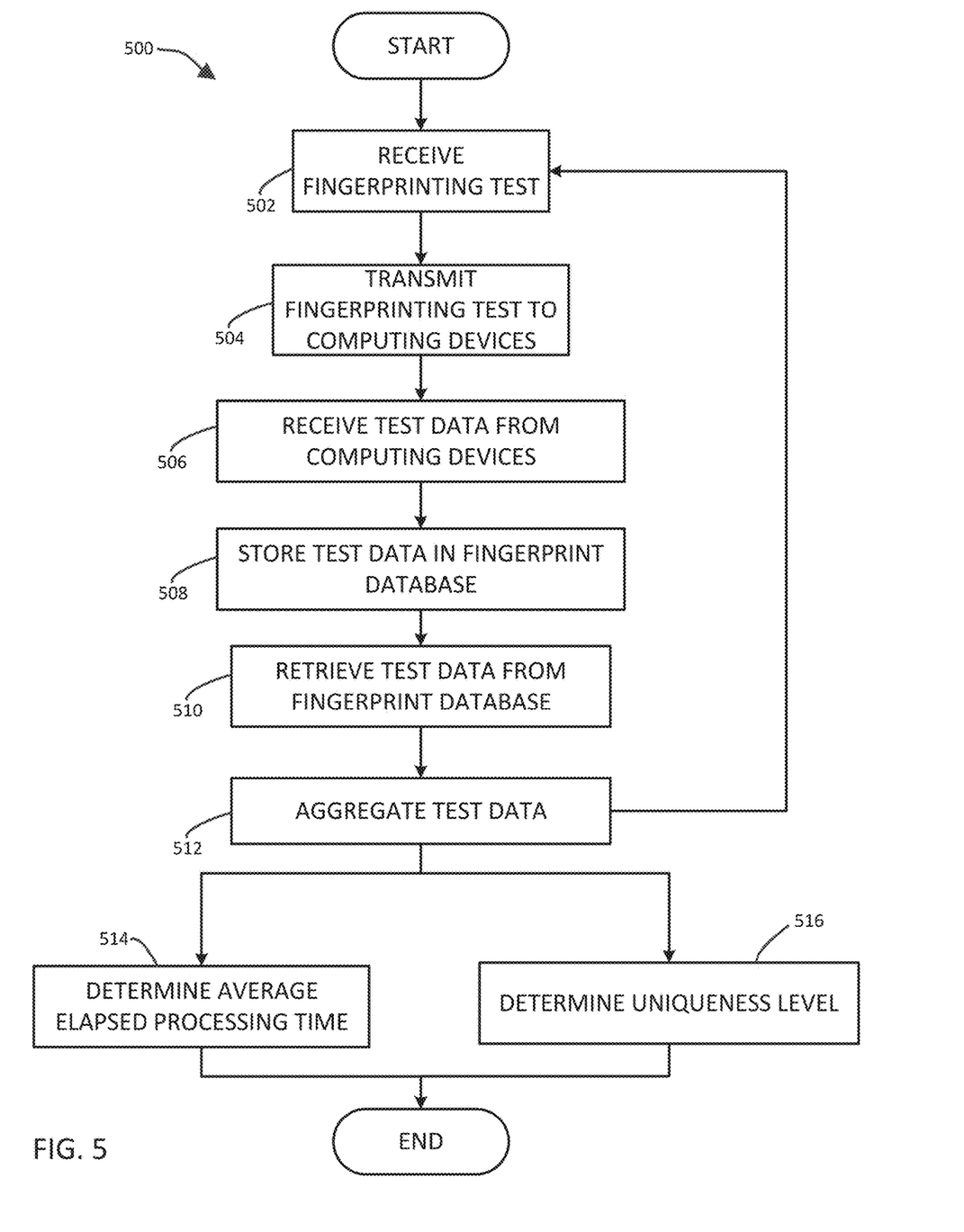
FIG. 5 is a flow chart of an embodiment of a process for improving computer identification using the system described herein.

FIG. 5 is a flow chart 500 illustrating an embodiment of a method of using the improved computer identification system as described herein. At 502, a server, such as testing server 85 may receive a particular fingerprinting test or method, either via a data file, programing script, or other suitable data storage or medium for storing executable instructions for running fingerprint test as described herein. At 504, the testing server may transmit the fingerprinting test to one or more computing devices that may run the fingerprinting test. In some embodiments, the computing devices may pull the fingerprinting test from the testing server when the test is triggered to run by a web browser running on the computing device. At 506, the testing server 85 may receive test data from the one or more computing devices reflecting test data such as device type, operating system, elapsed time to process test, hash code representation of image, etc. At 508, the server 85 may store the fingerprint test data in a fingerprint database connected to or housed within the testing server. The test data may be stored in the fingerprint database 90 and categorized so as to allow for subsequent data analysis comparing the data received from multiple different fingerprinting tests. At 510, the server 85 may retrieve data for particular fingerprinting test or related to particular device/browser combinations. In some embodiments, the testing server 85 may retrieve the elapsed processing times for the test run on each device and the hash codes for each device. At 512, the testing server 85 may aggregate the test data to determine, in some embodiments, an ideal fingerprinting test method for a given application. For example, the testing server may, at 514, determine an average elapsed processing time for a particular fingerprinting test over all tested devices and, at 516, determine a uniqueness level based on the retrieved hash code data. In some embodiments, the method may additionally include comparing the uniqueness level to a baseline or threshold uniqueness level, and/or comparing the average elapsed processing time. In some embodiments, the method may additionally include storing the uniqueness level and the average elapsed processing time in the fingerprint database 90 so as to be associated with the particular fingerprinting test to which they pertain.

In order to determine an ideal fingerprint testing method to maximize uniqueness while minimizing time, some embodiments may include using an iterative process utilizing different fingerprinting tests. Generally, in such embodiments, the testing server 85 may transmit a first fingerprinting test to a plurality of computing devices 55 and receive, store, and analyze the aggregated test data from the first fingerprinting test. In some embodiments, if the average elapsed processing time exceeds a maximum time threshold or the uniqueness level is less than a minimum uniqueness threshold (or both, or a combination of both), the server may determine a new fingerprinting test and transmit the new test to the computing devices 55 to receive and analyze test data from the new test to be compared to the thresholds. The thresholds for elapsed time and for uniqueness level may be determined in any suitable manner, such as by user selection or by using the baseline of a previously run fingerprinting test or of a best-known fingerprinting test. In some embodiments, the time and uniqueness thresholds may represent the goals for a particular application to run with an acceptable level of trustworthiness and speed. Such an iterative process may continue indefinitely until one or both of the thresholds is satisfied, until a predetermined number of iterations has been completed, until a predetermined ratio or relationship between the uniqueness level and the elapsed time has been achieved, or until any other suitable end goal may be reached.

In iterative embodiments, each subsequent fingerprinting test may differ in any suitable way that may be calculated to achieve improved results, or may even be altered randomly. In one example embodiment, the first fingerprinting test may include programing script instructing each computing devices 55 web browser to draw a sphere and a cube, each of a particular size, and the provide back lighting. A second fingerprinting test may instead instruct the web browsers to draw a sphere and a cone instead of a sphere and a cube. A third fingerprinting test may simply instruct the web browser to draw the sphere and cube larger than the particular size in the second fingerprinting test. As one of ordinary skill in the art will appreciate, the types of distinct fingerprinting tests that may be run may be substantially limitless. It should also be appreciated that, in some embodiments, each subsequent fingerprinting test may be transmitted to the same set of computing devices, but in other embodiments, each subsequent fingerprinting test may be transmitted to and run by a different set of computing devices.

Figure 6:
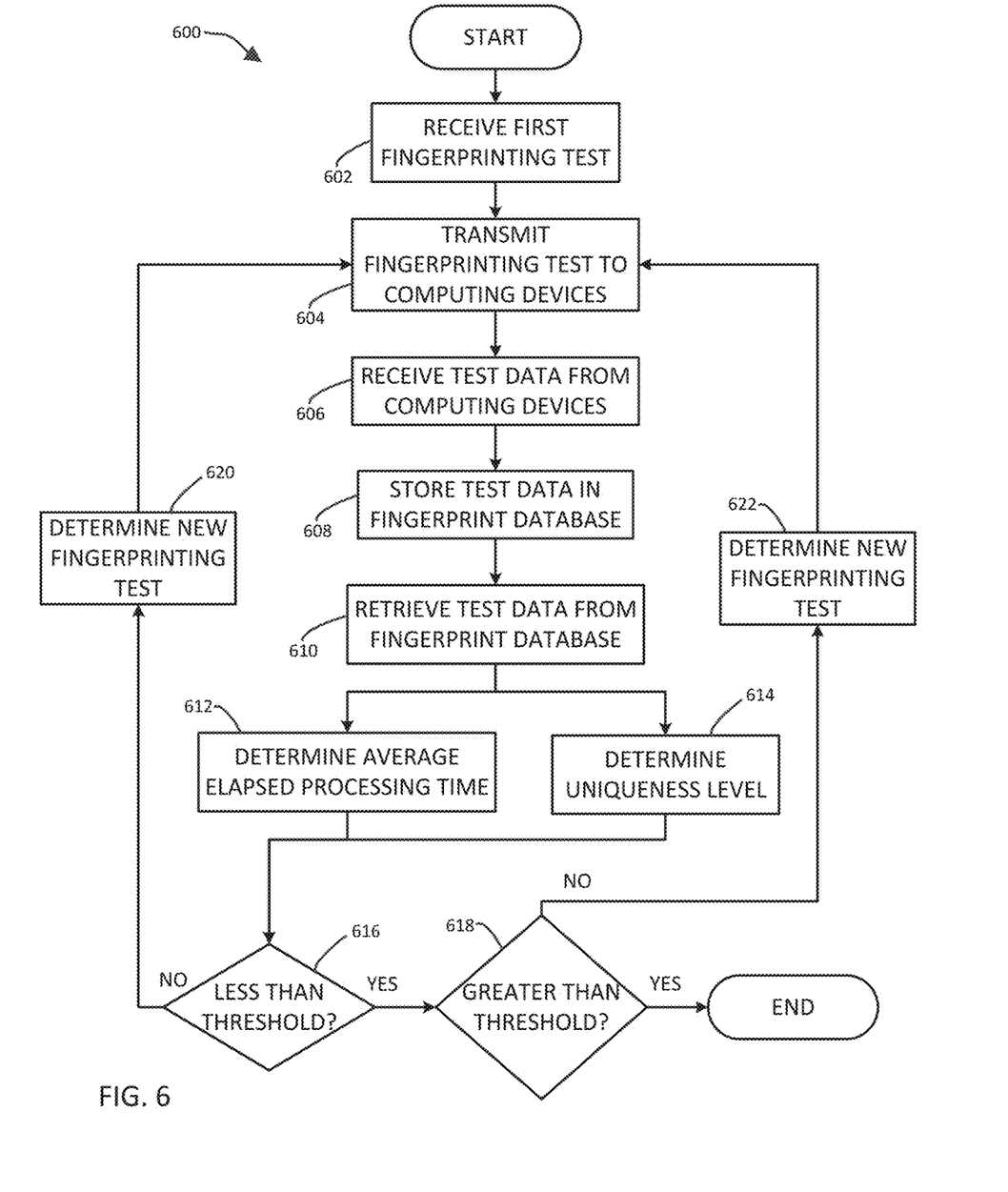
FIG. 6 is a flow chart of another embodiment of a process for improving computer identification using the system described herein.

FIG. 6 is a flow chart 600 illustrating an embodiment of a method of using the improved computer identification system in an iterative manner to identify improved fingerprinting methods and tests. At 602, first fingerprinting test may be received by the testing server 85. In some embodiments, the first fingerprinting test may be uploaded to the testing server 85 from another computing device, or coded or otherwise created on the server itself. At 604, the first fingerprinting test may be transmitted to one or more computing devices, such as computing devices 55a-55e. Web browser's or other software may run the first fingerprinting test and, at 606, the testing server 85 may receive test data for the first fingerprinting test from the computing devices 55. The test data may include any of a variety of information, but may at least include an elapsed processing time for the first fingerprinting test run on each individual device, and a hash code representing the results of the fingerprinting test drawing or other image. At 608, the testing server 85 may store the test data for the first fingerprinting test in a fingerprint database 90 and, at 610, the server may retrieve and aggregate the test data from the first fingerprinting test.

In some embodiments, the testing server 85 may then analyze the test data from the first fingerprinting test to determine at least two results either subsequently or simultaneously. At 612, the testing server 85 may determine a first average elapsed processing time for running the first fingerprinting test on the computing devices. At 614, the testing server 85 may determine a first uniqueness level, such as by comparing the hash codes retrieved from each device. In some embodiments, the testing server 85 may, at 616, compare the first average elapsed time to a predetermined threshold elapsed time value. If the server 85 determines that first average elapsed time is greater than the threshold elapsed time value, the server may, at 620, determine a new (i.e., second, third, fourth) fingerprinting test to be transmitted to and run on one or more computing devices. If the testing server 85 determines that the first average elapsed processing time is less than the time threshold, at 618, the server may determine whether the first uniqueness level is greater than a threshold uniqueness level value. If not, the testing server 85 may, at 622, determine a new fingerprinting test to run in a subsequent iteration. In some embodiments, if the uniqueness level is greater than the threshold uniqueness level, the testing server 85 may complete the iteration process. Those skilled in the art will recognize that, in some embodiments, the testing server 85 may perform the uniqueness level threshold comparison before the average elapsed processing time comparison. In some embodiments, where uniqueness level may be more important than processing time, the elapsed time threshold may be set at relatively high maximum value and the uniqueness level threshold may be set at a relatively high minimum uniqueness level. Alternatively, in embodiments where elapsed processing time may be more important than uniqueness level, the elapsed time threshold may be set at a relatively low maximum value and the uniqueness level threshold may be set at a relatively low minimum uniqueness level.

It is contemplated that the iterative testing process described above with reference to FIG. 6 may be performed manually in some embodiments. For example, a user may review the results of each iterative fingerprinting test and select or design a subsequent fingerprinting test to be evaluated. In some embodiments, the iterative process may be instead be automated such that the improved computer identification system may determine one or more preferable fingerprinting techniques. In some embodiments, the testing server 85 or the fingerprint database 90 may include a predetermined set of fingerprinting tests that may be automatically processed one after another, either at random or based on the results of each subsequent test.

In some embodiments, machine learning techniques may be used to iteratively determine an optimal or near-optimal fingerprinting test on the basis of elapsed time, uniqueness level, or a combination of both. After each fingerprinting test is run and the test data is received and analyzed, the server 85 or another computing component may analyze the results and create new test by automatically varying aspects of the previous test. For example, for each subsequent fingerprinting test, the server may make random or quasi-random alterations to the shapes drawn during the fingerprinting test, the colors used, the size of the images, etc. In some embodiments, instead of random alterations, the server may analyze trends in improved uniqueness or elapsed time based on alterations made in previous iterations. In such embodiments, the system may recognize patterns in the test results in view of the particularities of a the fingerprinting test parameters and make additional alterations to optimize subsequent tests. In some embodiments, the server may derive each subsequent fingerprinting test on the prior fingerprinting test if the prior fingerprinting test resulted in greater uniqueness levels or lower average elapsed processing time than the fingerprinting test used before. Such machine learning-based iterative processes may not be restricted, for example, by a human user's preconceived notions of what shapes should look like. As a result, the combinations of parameters a machine learning system may determine are optimal for a fingerprinting test may not have been contemplated by a human user.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the system and the methods described herein may be configured to efficiently provide improved or ideal browser fingerprinting techniques for a variety of applications. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A processor-implemented method for improving computer identification, the method comprising:
    transmitting, from a testing server via a digital communication network, a browser fingerprinting test to one or more computing devices, the browser fingerprinting test being computer readable instructions configured to execute via a web browser of each of the one or more computing devices;
    executing, by each of the one or more computing devices, the browser fingerprinting test using a web browser;
    creating, by each of the one or more computing devices, a hash code representing results of the browser fingerprinting test;
    storing, by each of the one or more computing devices, test data associated with the browser fingerprinting test including the hash code and an elapsed processing time;
    transmitting, from each of the one or more computing devices via the digital communication network, the test data to the testing server;
    receiving, by the testing server and via the digital communication network, the test data from each of the one or more computing devices;
    determining, by the testing server via one or more processors, an average elapsed processing time based on a sum of the elapsed processing times for each computing device and the total number of tested computing devices; and
    determining, via the one or more processors, a uniqueness level for the browser fingerprinting test by comparing the hash codes for each computing device with one another, wherein the uniqueness level provides an indication of how effective the browser fingerprinting test is at identifying each computer of the one or more computing devices.

2. The method of claim 1, wherein the uniqueness level may be a percentage of unique hash codes received from the total number of tested computing devices.

3. The method of claim 1 further comprising comparing, via the one or more processors, the average elapsed processing time to a threshold elapsed processing time value.

4. The method of claim 3 further comprising transmitting, via the digital communications network, a new browser fingerprinting test to the one or more computing devices when the average elapsed processing time is determined to be greater than the threshold elapsed processing time value.

5. The method of claim 1 further comprising comparing, via the one or more processors, the uniqueness level to a threshold uniqueness level value.

6. The method of claim 5 further transmitting, via the digital communications network, a new browser fingerprinting test to the one or more computing devices when the uniqueness level is determined to be lower than the threshold uniqueness level value.

7. The method of claim 1 further comprising determining, via the one or more processors, a ratio between the average elapsed processing time and the uniqueness level and comparing the ratio to a threshold ratio value.

8. The method of claim 1 further comprising:
    comparing, via the one or more processors, the average elapsed processing time to a threshold elapsed processing time value;
    comparing, via the one or more processors, the uniqueness level to a threshold uniqueness level value;
    transmitting, via the digital communications network, a new browser fingerprinting test to the one or more computing devices when at least one of the uniqueness level is determined to be lower than the threshold uniqueness level value or the average elapsed processing time is determined to be greater than the threshold elapsed processing time value.

9. The method of claim 8, wherein the new browser fingerprinting test is configured to execute via the web browser of each of the one or more computing devices differently than the browser fingerprinting test.

10. A system for improving computer identification, the system comprising:
    one or more computing devices; and
    a testing server including a memory and one or more processors wherein the memory contains processor-executable instructions to:
        transmit a browser fingerprinting test to each of the one or more computing devices, the browser fingerprinting test being computer readable instructions configured to execute via a web browser of each of the one or more computing devices;
        receive test data from the one more computing devices, the test data for each of the one or more computing devices including at least an elapsed processing time and a hash code;
        determine an average elapsed processing time based on the sum of the elapsed processing times for each computing device and the total number of tested computing devices; and
        determine a uniqueness level for the browser fingerprinting test by comparing the hash codes for each computing device with one another, wherein the uniqueness level provides an indication of how effective the browser fingerprinting test is at identifying each computer of the one or more computing devices; and wherein each of the one or more computing devices includes a memory and one or more processors wherein the memory contains processor-executable instructions to:

execute the browser fingerprinting test using a web browser;

create a hash code representing results of the browser fingerprinting test;

store test data associated with the execution of the browser fingerprinting test including the hash code and the elapsed processing time;

transmit the test data to the testing server.

11. The processor-readable non-transitory tangible medium of claim 10, wherein the uniqueness level may be a percentage of unique hash codes received from the total number of tested computing devices.

12. The processor-readable non-transitory tangible medium of claim 10 further comprising instructions to compare the average elapsed processing time to a threshold elapsed processing time value.

13. The processor-readable non-transitory tangible medium of claim 12 further comprising instructions to transmit a new browser fingerprinting test to the one or more computing devices when the average elapsed processing time is determined to be greater than the threshold elapsed processing time value.

14. The processor-readable non-transitory tangible medium of claim 10 further comprising instructions to compare the uniqueness level to a threshold uniqueness level value.

15. The processor-readable non-transitory tangible medium of claim 14 further comprising instructions to transmit a new browser fingerprinting test to the one or more computing devices when the uniqueness level is determined to be lower than the threshold uniqueness level value.

16. A processor-implemented method for improving computer identification, the method comprising:

transmitting, from a testing server via a digital communication network, a first browser fingerprinting test to one or more computing devices, the first browser fingerprinting test being computer readable instructions configured to execute via a web browser of each of the one or more computing devices;

executing, by each of the one or more computing devices, the first browser fingerprinting test using a web browser;

creating, by each of the one or more computing devices, a first hash code representing results of the first browser fingerprinting test;

storing, by each of the one or more computing devices, first test data associated with the first browser fingerprinting test including the first hash code and a first elapsed processing time;

transmitting, from each of the one or more computing devices via the digital communication network, the first test data to the testing server;

receiving, via the digital communication network, the first test data for the first browser fingerprinting test from the one or more computing devices;

based on the first elapsed processing time for each computing device in the first test data, determining, by the testing server via one or more processors, a first average elapsed processing time for the first browser fingerprinting test;

based on the first hash code for each computing device in the first test data, determining, via the one or more processors, a first uniqueness level by comparing the hash codes for each computing device in the first test data with one another, wherein the first uniqueness level provides an indication of how effective the first browser fingerprinting test is at identifying each computer of the one or more computing devices;

comparing, via the one or more processors, the first average elapsed processing time to a threshold elapsed processing time value and the first uniqueness level to a threshold uniqueness level value; and transmitting, from the testing server via the digital communications network, a second browser fingerprinting test to the one or more computing devices when at least one of the first uniqueness level is determined to be lower than the threshold uniqueness level value or the first average elapsed processing time is determined to be greater than the threshold elapsed processing time value.

17. The method of claim 16, wherein the second browser fingerprinting test is configured to execute via the web browser of each of the one or more computing devices differently than the first browser fingerprinting test.

18. The method of claim 16 further comprising:

receiving, via the digital communication network, second test data for the second browser fingerprinting test from the one or more computing devices, the second test data for each of the one or more computing devices including at least a second elapsed processing time and a second hash code;

based on the second elapsed processing time for each computing device in the second test data, determining, via the one or more processors, a second average elapsed processing time for the second browser fingerprinting test; and based on the second hash code for each computing device in the second test data, determining, via the one or more processors, a second uniqueness level by comparing the second hash codes for each computing device in the second test data with one another.

19. The method of claim 18 further comprising:

comparing, via the one or more processors, the first average elapsed processing time to the second average elapsed processing time; and comparing, via the one or more processors, the first uniqueness level to the second uniqueness level.

20. The method of claim 19 further comprising deriving, via the one or more processors, a third browser fingerprinting test based on the second browser fingerprinting test when at least one of the second average elapsed processing time is less than the first average elapsed processing time or the second uniqueness level is greater than the first uniqueness level.

* * * * *